(12) United States Patent
Petty

(10) Patent No.: US 6,212,189 B1
(45) Date of Patent: Apr. 3, 2001

(54) ARRANGEMENT FOR MINIMIZING CELL-DELAY VARIATIONS IN A COMMUNICATIONS SYSTEM THAT SUPPORTS MULTIPLE CONSTANT-BIT-RATE CONNECTIONS

(75) Inventor: Norman W. Petty, Boulder, CO (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/096,887

(22) Filed: Jun. 12, 1998

(51) Int. Cl.[7] .................................................. H04L 12/56
(52) U.S. Cl. .......................... 370/395; 370/474; 370/516
(58) Field of Search .................................... 370/516, 517, 370/395, 351, 352, 470, 468, 508, 512, 518, 252, 230, 474, 412, 415, 416

(56) References Cited

U.S. PATENT DOCUMENTS

| 5,784,358 | * | 7/1998 | Smith et al. | 370/230 |
| 5,844,906 | * | 12/1998 | Khelghatti et al. | 370/474 |
| 5,936,958 | * | 8/1999 | Soumiya et al. | 370/395 |
| 5,982,748 | * | 11/1999 | Yia et al. | 370/232 |
| 5,991,272 | * | 11/2000 | Key et al. | 370/252 |
| 6,064,652 | * | 5/2000 | Buckland et al. | 370/235 |

FOREIGN PATENT DOCUMENTS

| 0702473 | 3/1996 | (EP) | H04Q/11/04 |
| 0710046 | 5/1996 | (EP) | H04L/12/56 |
| WO98/04098 | 1/1998 | (WO) | H04Q/11/04 |

OTHER PUBLICATIONS

Martin de Prycker, "Controlling how to establish a connection," *Asynchronous Transfer Mode: Solution for Broadband ISDN*, Second Edition, 1993, p. 344, section 7.2.1.

Why ATM Makes Sense Here, Computer Telephony, Apr. 1998, p. 74.

D. Spencer, DEFINITY[R] Enterprise Communications Server ATM Integration, Lucent Technologies White Paper, Sep. 11, 1997, pp. 1–15; A–1 –A9.

* cited by examiner

Primary Examiner—Douglas W. Olms
Assistant Examiner—Ken Vanderpuye
(74) Attorney, Agent, or Firm—David Volejnicek (57) ABSTRACT

An ATM cell constructor (100) limits transmission-delay variations between successive cells of traffic of individual narrowband and wideband channels in a multi-channel environment. Whenever an ATM AAL1 layer (112) of processing completes assembling (606) an ATM cell payload for a narrowband channel (611), it increments (612) a count that anticipates the number of ATM cells that will mature for transmission during the next cell construction period. For wideband channels, a function checks (1010) whether traffic from the number of narrowband channels that form the wideband channel will result in completion of assembly of that channel's cell payload during the next cell construction period; if so, the function increments (1012) the abovementioned count. The count is reset (302) at the beginning of each cell construction period. Upon receipt (700) of a command to add (start processing) a new channel, a TSI controller (132) compares (704) the count against a threshold that equals the total number of presently-active channels divided by the number of octets of traffic carried by each cell, plus one. If the threshold exceeds the count, the TSI controller sets up (706) a TSI (108) to start processing the new channel; otherwise the TSI controller delays (712–714) setting up the TSI to process the new channel until occurrence (902) of a cell construction period when the threshold exceeds the count. The net effect is to shift the delay variations from cells of active channels to the start-up of processing of new channels.

35 Claims, 8 Drawing Sheets

ARRANGEMENT FOR MINIMIZING CELL-DELAY VARIATIONS IN A COMMUNICATIONS SYSTEM THAT SUPPORTS MULTIPLE CONSTANT-BIT-RATE CONNECTIONS

TECHNICAL FIELD

This invention relates generally to packet-switching systems, such as asynchronous transfer mode (ATM) systems, and specifically to transmission-delay variations in such systems.

BACKGROUND OF THE INVENTION

Today's business communications environment consists of two separate network infrastructures: a voice network (such as a private branch exchange (PBX)) characterized by real-time, high-reliability, constant bit-rate (CBR) connections; and a data network (such as a packet network) characterized by high-bandwidth variable bit-rate (VBR) connections. Business needs for simplified maintenance, management, and access to information on diverse networks are forcing the convergence of these networks along with a new class of real-time multimedia networks. Asynchronous transfer mode (ATM) provides a single infrastructure that cost-effectively and flexibly handles both switching and transmission for the traffic types mentioned above (voice, video, and data) for both local-area networks and wide-area networks. The evolving network convergence requires the adaptation of the legacy PBX voice traffic to ATM. Voice telephony over ATM (VTOA) specifications allow adaptation of compressed or uncompressed voice pulse-code modulated (PCM) data streams into streams (virtual circuits) of CBR cells.

An ATM cell, regardless of the traffic it carries, is a packet 53 octets long: 48 octets of payload attached to a 5 octet header. The header contains addressing and management information used to direct the cell from source to destination and to ensure that the negotiated aspects of the traffic-flow through the ATM network are met. CBR traffic is assembled into cell payloads using ATM Adaptation Layer 1 (AAL1). The AAL1 cell constructor layer uses the first octet of the payload for its header and the remaining 47 octets to carry CBR information. ATM cell construction is then completed by attaching the ATM header to the payload.

The PBX provides multiple PCM streams (active channels, or existing calls) to multiple instances of the cell constructor, and the number of PCM streams and cell constructor instances changes as calls are added or removed. Assuming uncompressed-data, the PBX provides each instance of the cell constructor with one PCM octet every 125 microseconds (assuming a standard 8000 Hz sampling rate). It requires 5.875 milliseconds to fill a cell (47 octets * 125 microseconds/octet). Each fully-constructed (mature) cell is queued for transmission. Using a standard OC3c 155.52 MHz fiber optic interface, it takes 2.83 microseconds to transmit a cell. This creates a large variation in cell delay (jitter) through the transmit queue between a cell that enters the queue when it is the only cell to mature during the cell construction period and cells that enter the transmit queue when cells for many (a large fraction) of the channels (PCM streams) in the system mature at the same time. The variations in cell delay range from 2.83 microseconds for one cell maturing in a cell construction period to 682 microseconds for 241 cells maturing during a cell construction period (assuming a PBX that supports up to 241 simultaneous conversations). Such variation in delay is anathema to the concept of constant-bit-rate traffic.

SUMMARY OF THE INVENTION

This invention is directed to solving these and other problems and disadvantages of the prior art. According to the invention, variations in cell delay of existing streams (calls) are kept to a minimum by shifting the variations to the start times of processing of new streams, by manipulating the start times of processing of those new streams. Delays in starting up a call are much-less apparent and hence much-more tolerable than traffic jitter in the midst of a call. The invention therefore shifts the cell-delay variations from the midst of existing calls to the beginning of new calls, where those variations will not be noticed. Broadly according to the invention, traffic-delay variations of existing communications are limited by maintaining substantially constant traffic-delays in the traffic of existing communications, and shifting delay variations to traffic-start times of new communications. The shifting is preferably effected by manipulating (e.g., delaying) the start times of the new communications, in facilities shared by the existing and the new communications.

More specifically according to the invention, the transmission-delay variations between transmitted segments (e.g., packet payloads) of communications traffic of individual communications channels in a multi-channel transmission system are limited as follows. A determination is made of whether traffic segments from too many channels become available for transmission at a same time. This determination is preferably effected by anticipating whether the segments of traffic from too many channels will become available for transmission at the same time, e.g., during a same period of time such as a cell construction time, which is the period of time during which a segment of traffic (a cell) from each channel can become available for transmission. If it is determined that segments of too many channels do not become available at that same time, another (waiting) channel is allowed to commence making its segments of traffic available for transmission at that same time. But if it is determined that segments of too many channels do become available at that same time, the other channel is prevented from commencing to make its segments of traffic available for transmission at that same time. Preferably, the prevention continues until such time as it is determined that segments of too many channels do not become available at said such time, whereupon the other channel is allowed to commence making segments of its traffic available for transmission at said such time.

According to an illustrative embodiment of the invention, the transmission-delay variations between successive ATM cells of traffic of individual channels (preferably both narrowband and wideband) in a multi-channel ATM system is limited as follows. A determination is made of how many cells will mature for transmission in a next cell construction period—a period of time during which each channel could mature a cell. The determined number of maturing cells is then compared against a threshold, which is preferably proportional to the total number of presently-transmitting channels, and illustratively comprises the total number of presently-transmitting channels divided by the number of octets of traffic carried by each cell (47), plus one. If the number of maturing cells falls below the threshold, a channel waiting to begin transmission is permitted to begin maturing cells for transmission during that next cell construction period. But if the number of maturing cells does not fall below the threshold, the waiting channel is prevented from commencing to mature cells for transmission during that next cell construction period. Preferably, the determination and comparison are made at least during each cell construction period during which there is a channel waiting to begin transmission, and the waiting channel is permitted to commence maturing cells for transmission during the first cell construction period for which the number of maturing cells is determined to fall below the threshold.

Even more specifically, the invention provides a feedback path from the element that constructs cells (SAR—Segmentation And Reassembly) to the control element of the element that provides constant bit-rate (CBR) data (TSI—Time Slot Interchange). An anticipation circuit in the cell constructor provides the CBR data-provider control element with a count of the number of cells it will start constructing during the next construction period. The CBR data-provider control element waits to start a new CBR stream if the cell-start count is greater than the number of CBR streams divided by 47 (48 payload octets less 1 header octet in AAL1 cell payload). This function adds a new stream when the cell-start count is 0 and there are fewer than 47 CBR steams, when the cell-start count is 1 or 0 and there are fewer than 93 CBR steams, . . . and when the cell-start count is 5 or less and there are fewer than 240 CBR steams (assuming a source of CBR streams that supports up to 241 simultaneous streams). This function dynamically maintains uniform cell-construction starts and therefore uniform cell maturation and transmission across 47 cell construction periods as CBR steams are added to or removed from the processing load. In the example of the PBX described in the Background of the Invention, the maximum cell-delay varies from 2.83 microseconds to 14.15 microseconds with the use of this technique, instead of from 2.83 microseconds to 682 microseconds without the use of this technique.

The invention includes both a method of limiting delay variations as well as a corresponding apparatus and a computer readable medium that contains software which, when executed in a computer, causes the computer to perform the method. The apparatus preferably includes an effector—any entity that effects the corresponding step, unlike a means—for each method step.

These and other features and advantages of the present invention will become more apparent from the following description of an illustrative embodiment of the invention considered together with the drawing.

DETAILED DESCRIPTION

Figure 1:
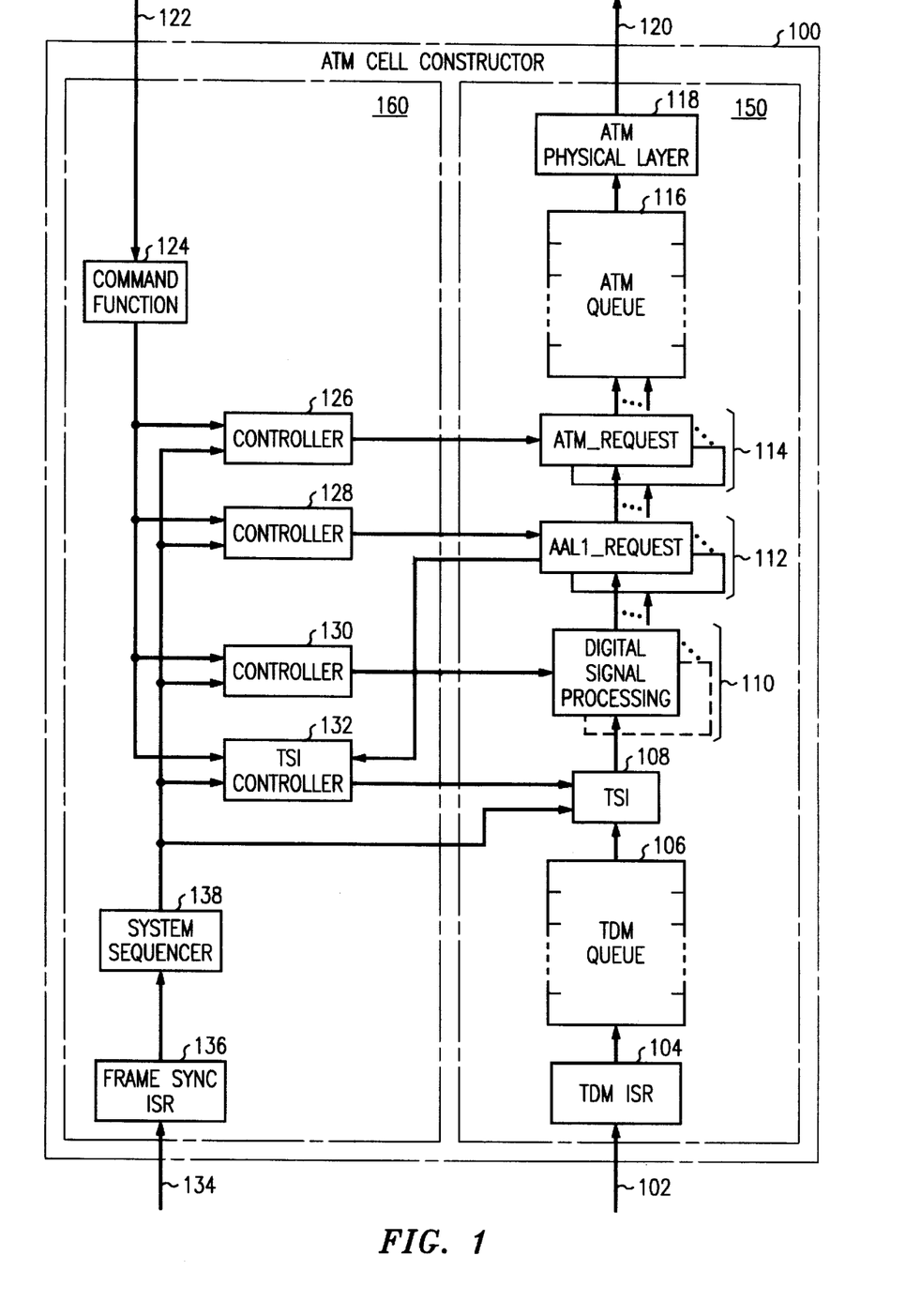
FIG. 1 is a block diagram of an ATM cell constructor that includes an illustrative embodiment of the invention.

FIG. 1 shows an ATM cell constructor 100, such as may be used in an interface port circuit of a PBX or in any other ATM interface apparatus to construct ATM cells from CBR traffic, such as voice and/or video traffic. Cell constructor 100 and each of its components may be individually implemented either in hardware or in software/firmware. In the latter case, the software or firmware may be stored in any desired memory device readable by a computer—for example, a Read Only memory (ROM) device readable by an interface port circuit processor. Multiple streams (also referred to herein as channels, calls, or communications) of CBR traffic are received by cell constructor 100 over a communications medium 102, and follow a data path 150 through ATM cell constructor 100 where successive segments of the traffic streams are formed into packets,(ATM cells). If the switching system employing cell constructor 100 is the Definity® PBX of Lucent Technologies Inc., medium 102 is a time-division multiplexed (TDM) bus that carries up to 241 individual streams of traffic in 241 individual time slots of repeating frames. Each frame carries one (narrowband) or more (wideband) time slots of each channel's traffic stream. Each time slot carries one byte (octet) of traffic.

A TDM interrupt service routine (ISR) 104 captures traffic from designated time slots of medium 102 and feeds them serially into a TDM queue 106. A time-slot interchanger (TSI) 108 retrieves time slots of traffic from TDM queue 106 and performs any necessary time-slot interchange function thereon. TSI 108 provides support for wideband channels that comprise multiple time slots; it ensures that those time slots are processed in their proper order. TSI 108 then feeds the reordered time slots of traffic into one or more digital signal processors (DSPs) 110. A single DSP 110 may be time-shared by the plurality of channels, or a separate DSP 110 may be dedicated to serving each channel. DSPs 110 perform designated processing for the traffic of each channel, e.g., conferencing, echo cancellation, gain adjustment, compression, etc. The processed traffic of each channel is output by DSPs 110 into a separate instance of AAL1-request processor 112, each dedicated to serving a different channel. Each instance of AAL1-request processor 112 constructs ATM cell payloads (traffic segments) from the corresponding channel's received traffic. Whenever it completes construction of a single cell's payload, an instance of AAL1-request processor 112 sends that payload to a corresponding instance of ATM-request processor 114. There is one instance of ATM-request processor 114 per channel. An instance of ATM-request processor 114 attaches an ATM cell header to the payload to complete the construction of an ATM cell and feeds the ATM cell into an ATM queue 116. ATM queue 116 is fed by all instances of ATM-request processor 114. An ATM physical layer processor 118 sequentially retrieves cells from ATM queue 116 and transmits them on an ATM communications medium 120 toward their destinations.

It takes on the order of a TDM bus frame-interval to process an individual time slot of traffic through data path 150; of course, up to a frame's worth of time slots may be processed in parallel. A TDM bus frame-interval is therefore taken as a cell construction period. It is a predetermined time interval during which each instance of ATM-request processor 114 can mature an ATM cell for transmission.

A control structure 160 controls the operation of the components of data path 150. Cell constructor 100 receives control information over a control medium 122. If the switching system employing cell constructor 100 is the abovementioned Definity PBX, control medium 122 is illustratively either a control channel defined by the first 5 time slots of frames of the TDM bus of the PBX or a packet bus of the PBX. The control information is received in cell constructor 100 by a command function 124. This is a management function which tells controllers 126–132 of individual components of data path 150 what their component should be doing and when. For example, it tells TSI controller 132 when TSI 108 should begin to support a new time slot and which instance of AAL1-request 112 that time slot should be associated with, it tells controller 126 what VCI/VPI an instance of ATM-request 114 should use for a particular channel, it tells controller 128 when to initialize an instance of AAL1-request 112 for a new channel, and it tells DSP 10 what processing to perform for which channel. Controllers 126–132 then exert the corresponding necessary control over their associated components in data path 150.

Significantly, TSI controller 132 also receives feedback from AAL1-request 112. TSI controller 132 is notified each time an instance of AAL1-request 112 has completed construction of an ATM cell payload and has sent the payload on to ATM-request 114. That tells TSI controller 132 that the ATM-request 114 instance corresponding to the notifying instance of AAL1-request 112 will be maturing an ATM cell for transmission during the next cell construction period (next TDM bus 102 frame period). In other words, the notification serves TSI controller 132 to anticipate how many ATM cells will be maturing at any one same time. If TSI controller 132 has just been told by command function 124 to cause TSI 108 to start processing a new channel (a new call), TSI controller 132 may delay doing so for one or more cell construction periods so as to ensure that ATM cells of the notifying AAL1-request 112 instance and of the AAL1-request 112 instance that will be handling the new channel do not mature at the same time (during the same frame periods) and thereby cause variations in cell transmission delay. More on this later.

To keep cell constructor 100 properly synchronized with the operation of communications medium 102 in the instance where medium 102 is a TDM bus, a start-of-frame signal is supplied to cell constructor 100 via a signal line 134. Line 134 is monitored by a frame sync interrupt service routine (ISR) 136, which issues an interrupt each time that it detects the start-of-frame signal. The interrupt is received by a system sequencer 138, which is a state machine that causes the components of data path 150 to step through their functions during each frame period.

Figure 2:
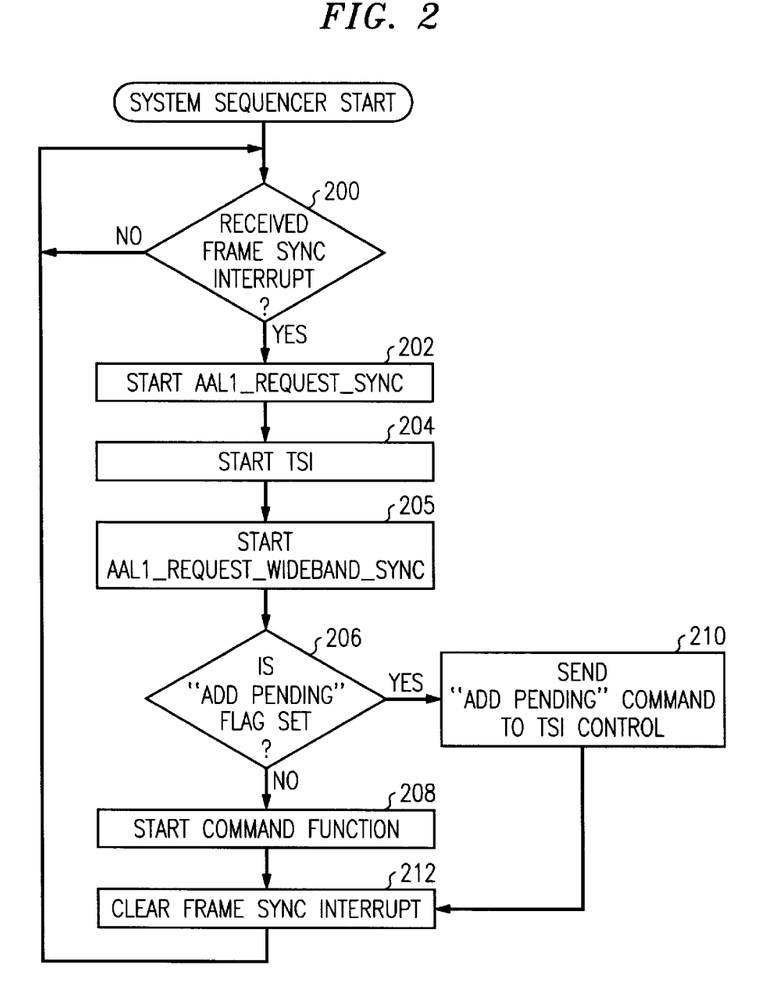
FIG. 2 is a functional flow diagram of operations of a system sequencer of the ATM cell constructor of FIG. 1.
Figure 9:
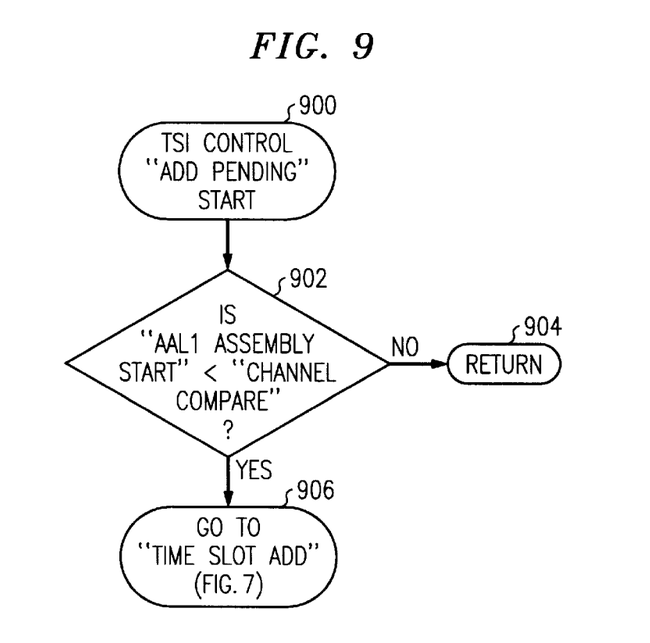

High-level functionality of system sequencer 138 is shown in FIG. 2. System sequencer 138 awaits receipt of a frame sync interrupt from frame sync ISR 136, at step 200. Upon receipt of the interrupt, system sequencer 138 starts (e.g., invokes execution of) AAL1-request sync (a global function of AAL1-request 112), at step 202, of TSI 108, at step 204, and of AAL1-request-wideband-sync (also a global function of AAL1-request 112), at step 205. System sequencer 138 then checks if an "add pending" flag is set, at step 206. If this flag is set, it means that there is a new channel waiting to be processed, the start of whose processing has been delayed to prevent too many ATM cells from maturing at the same time. If the flag is set, system sequencer 138 sends an "add pending" command to TSI control 132, at step 210. The response of TSI control 132 to this command is shown in FIG. 9. If the "add pending" flag is not set, system sequencer 138 starts command function 124, at step 208. Following step 208 or 210, system sequencer 138 clears the frame sync interrupt, at step 212, and returns to step 200 to await receipt of the next frame sync interrupt.

Figure 3:
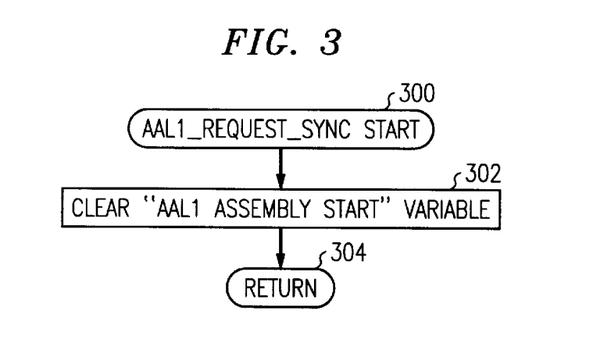
FIG. 3 is a functional flow diagram of operations of an AAL1-request-sync function of an AAL1-request component of the ATM cell constructor of FIG. 1.

The functionality of the AAL1-request-sync function of AAL1-request 112 is shown in FIG. 3. Upon its invocation, at step 300, the function clears an "AAL1 assembly start" global variable, at step 302, and then returns to the point of its invocation, at step 304.

Figure 4:
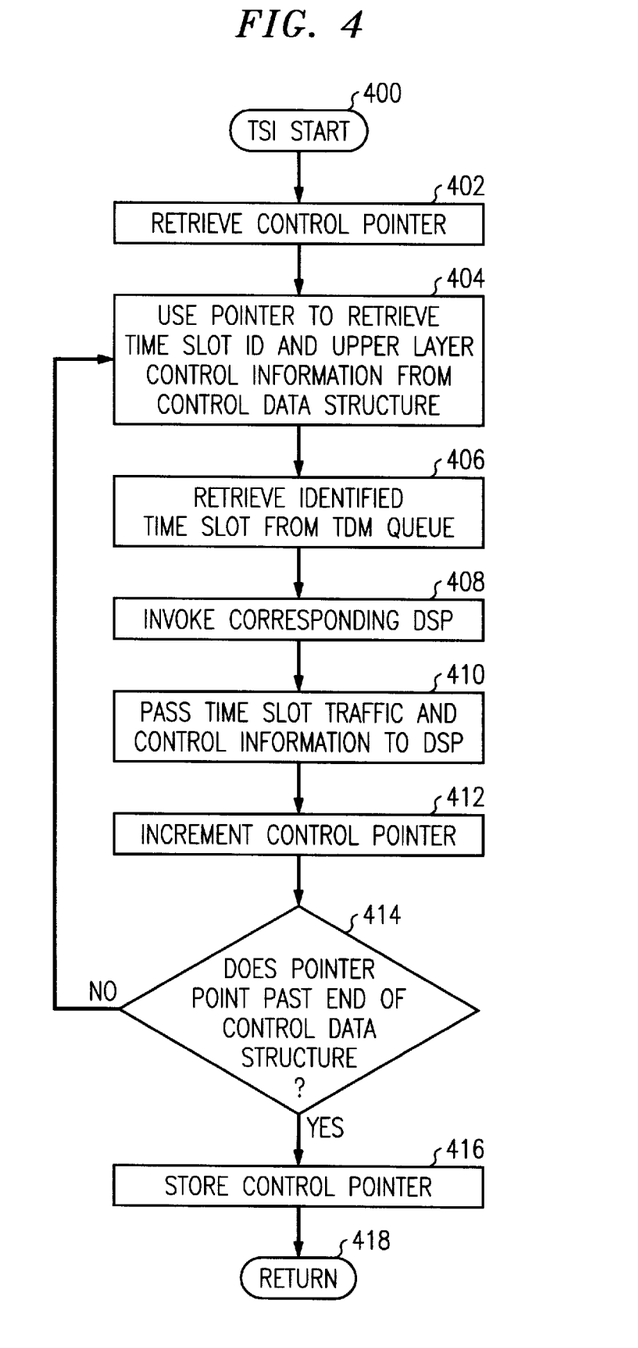
FIG. 4 is a functional flow diagram of operations of a time slot interchange (TSI) of the ATM cell constructor of FIG. 1.

The high-level functionality of TSI 108 is shown in FIG. 4. Upon its invocation, at step 400, TSI 108 retrieves a pointer to its own control data structure, at step 402, and then uses the pointer to retrieve a time slot identifier plus upper-layer control information for that time slot from the control data structure, at step 404. The upper-layer control information includes information on what processing DSP 110 must perform on this time slot, and an identifier of the instance of AAL1-request 112 that this time slot is associated with. TSI 108 then uses the time slot ID to retrieve the corresponding time slot of traffic from TDM queue 106, at step 406, if necessary invokes the time slot's corresponding instance of DSP 110, at step 408, and passes the traffic and the upper-layer control information to DSP 110, at step 410. TSI 108 then increments the pointer to its own control data structure, at step 412, and checks whether the pointer points past the last control data structure entry, at step 414. If not, it means that TSI 108 has not yet processed an entire TDM frame of time slots, and so TSI 108 returns to step 404. If the pointer does point past the end of the control data structure, it means that TSI 108 has finished processing a whole TDM frame, and so TSI 108 merely resets and stores the pointer, at step 416, and returns to the point of its invocation, at step 418.

Figure 5:
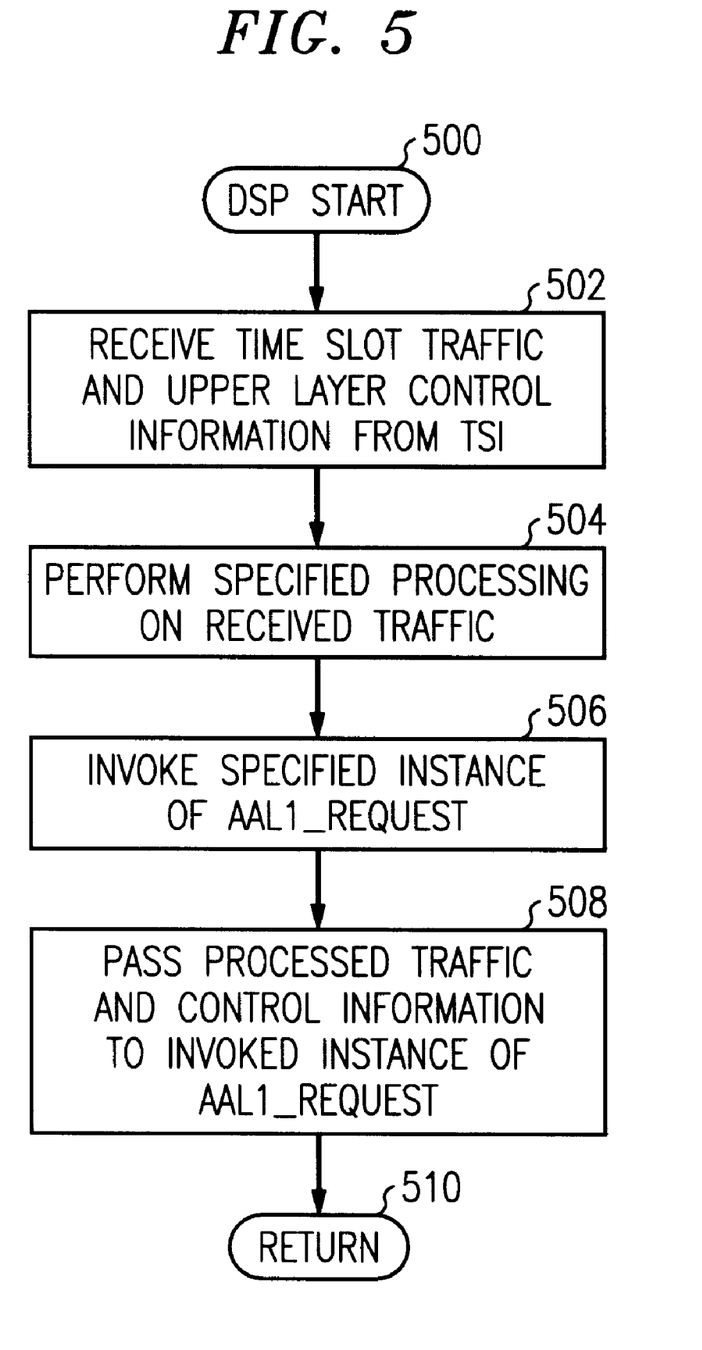
FIG. 5 is a functional flow diagram of operations of a digital signal processor (DSP) of the ATM cell constructor of FIG. 1.

The high-level functionality of each instance of DSP 110 is shown in FIG. 5. Upon its invocation, at step 500, the instance of DSP 110 receives a time slot of traffic and upper layer control information from TSI 108, at step 502. DSP 110 then performs the processing specified by the received control information on the received traffic, at step 504. DSP then invokes the instance of AAL1-request 112 that is specified by the received control information, at step 506, and passes it the control information and the processed traffic, at step 508. DSP 110 then returns to the point of its invocation, at step 510.

Figure 6:
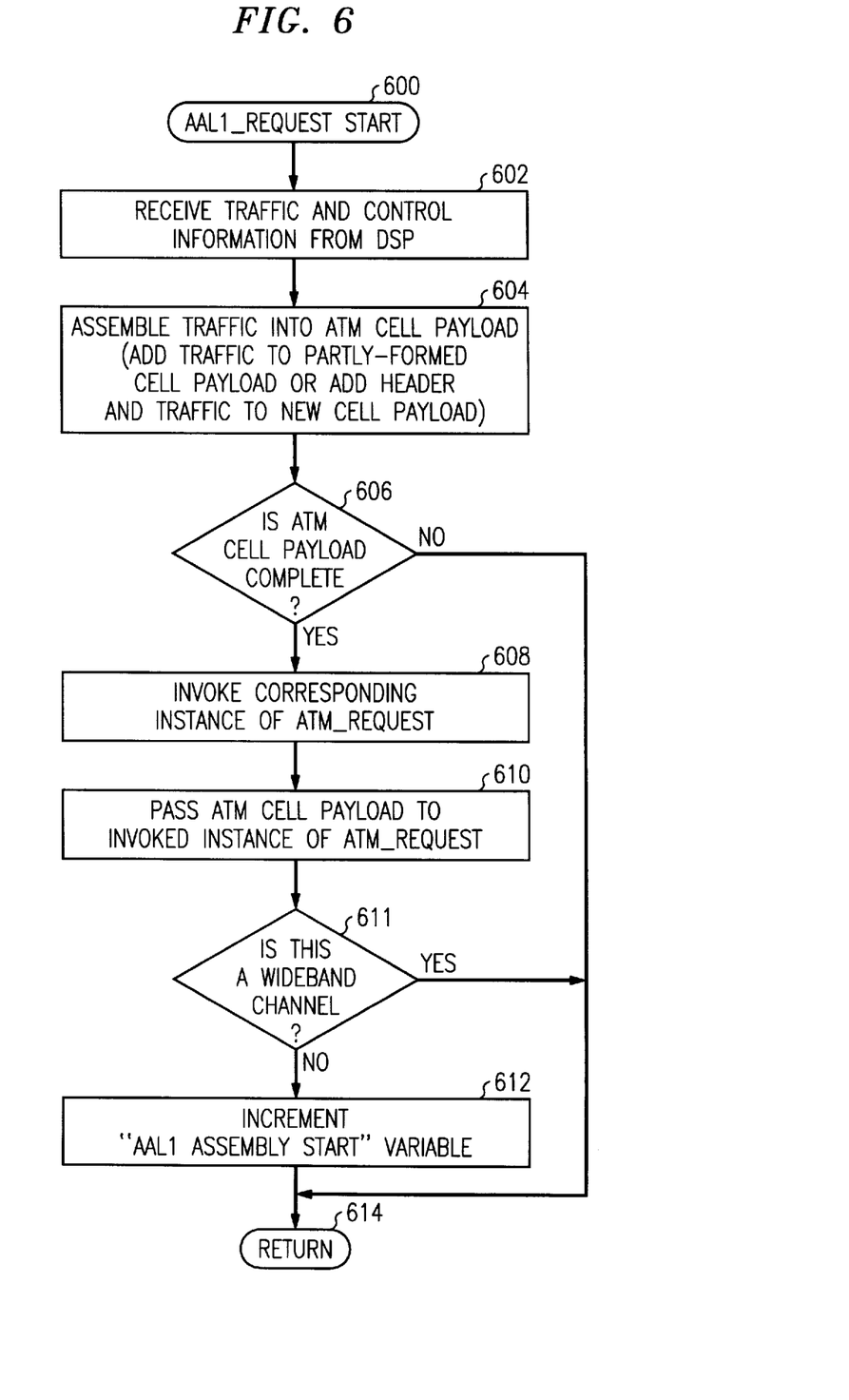
FIG. 6 is a functional flow diagram of operations of the AA1-request component of the ATM cell constructor of FIG. 1.

The high-level functionality of each instance of AAL1-request 112 is shown in FIG. 6. Upon its invocation, at step 600, the invoked instance of AAL1-request 112 receives processed traffic and accompanying control information from DSP 110, at step 602. The invoked instance of AAL1-request 112 then assembles the received traffic into an ATM cell payload, at step 604. If the invoked instance of AAL1-request 112 presently has a partly-formed cell payload, it adds the received traffic to that payload. If the invoked instance of AAL1-request 112 presently does not have a partly-formed cell payload, it starts assembling a new cell payload by attaching the received traffic to an AAL1 layer header byte. AAL1-request 112 then checks whether it has just completed assembling an ATM cell payload, at step 606. If not, it merely returns, at step 614; if so, it invokes a corresponding instance of ATM-request 114, at step 608, and passes to it the completed ATM cell payload, at step 610. AAL1-request 112 then checks whether the channel that it is presently processing is a narrowband (single time-slot per frame) or a wideband (multiple time-slots per frame) channel, at step 611. If it is a narrowband channel, AAL1-request 112 increments the "AAL1 assembly start" global variable, at step 612, to notify TSI controller 132 of maturation of another ATM cell during the next frame period. If it is a wideband channel, AAL1-request 112 skips step 612 and leaves it up to AAL1-request-wideband-sync function of FIG. 10 to handle the notification. AAL1-request 112 then returns, at step 614.

Figure 7:
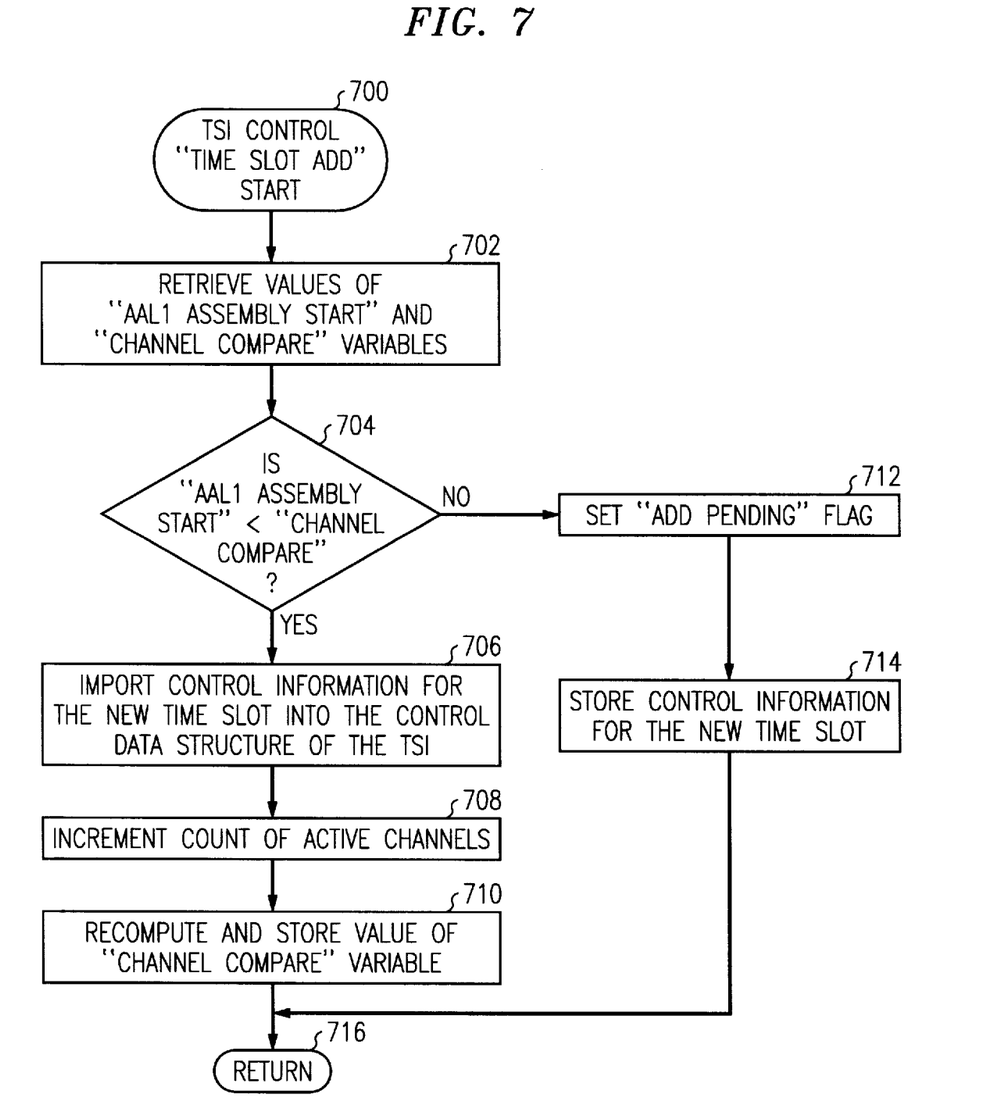
FIGS. 7–9 are functional flow diagrams of operations of a TSI controller of the ATM cell constructor of FIG. 1 in response to receipt of "time slot add", "time slot remove", and "add pending" commands, respectively.
Figure 8:
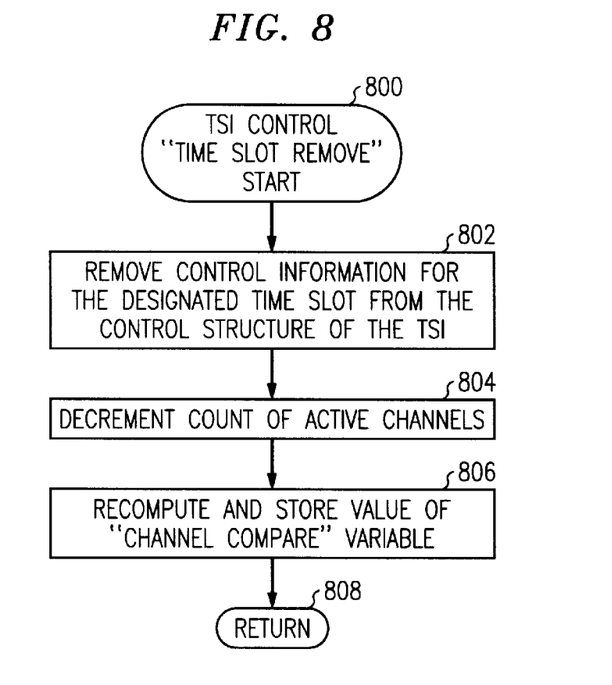

The high-level functionality of TSI controller 132 is shown in FIGS. 7–9. FIG. 7 shows the response of TSI controller 132 to the receipt of a "time slot add" command from command function 124. Upon receipt of the command, at step 700, TSI controller 132 retrieves the present values of the "AAL1 assembly start" global variable (see step 302 of FIG. 3 and step 612 of FIG. 6) and of a "channel compare" internal variable, at step 702. The value of the "channel compare" variable is proportional to the number of presently-active channels. It is computed by TSI controller 132 and equals the number of active channels being processed by cell constructor 100 divided by 47 (the number of time slots (octets) of traffic carried by an ATM cell), plus one. The value of "channel compare" represents the maximum number of cells that should be allowed to mature at the same time (during the same cell construction period). Consequently, this formula allows processing of traffic of a new stream (channel) to begin when the "AAL1 assembly start" count is zero and there are fewer than 47 streams presently being processed, when the "AAL1 assembly start" count is zero or one and there are fewer than 93 streams presently being processed, and so on, up to when the "AAL1 assembly start" count is five or less and there are fewer than 240 streams presently being processed. This formula dynamically maintains a substantially-uniform number of cell-construction starts—and therefore a substantially-uniform number of cell maturations and transmissions—across the 47 cell construction periods as streams are added to or removed from the workload of cell constructor 100, whereby transmission-delay variations between successive ATM cells of individual channels are minimized.

Returning to step 702, TSI controller 132 checks whether the value of the "AAL1 assembly start" variable (representing the number of cell payloads that have been reported by AAL1-request 112 to have matured during this cell construction interval) is less than the value of the "channel compare" variable, at step 704. If so, TSI controller 132 inserts the control information for the new time slot into the control data structure of TSI 108, at step 706. This enables cell constructor 100 to start processing the traffic of this new channel which is waiting for processing. TSI controller 132 then increments an internal count of the number of active channels, at step 708, and recomputes and stores the value of the "channel compare" variable, at step 710. If the value of the "AAL1 assembly start" variable is not less than the value of the "channel compare" variable, at step 704, TSI controller 132 sets the "add pending" flag, at step 712, and stores the control information for the new time slot that it received as a part of the "time slot add" command, at step 714. This prevents cell constructor 100 from starting processing of the new channel's traffic at this time, and delays the start of that processing until a later time when TSI controller 132 programs TSI 108 to start processing this channel. Following step 710 or 714, TSI controller 132 returns to the point of its invocation, at step 716.

FIG. 8 shows the response of TSI controller 132 to the receipt of a "time slot remove" command from command function 124. Upon receipt of the command, at step 800, TSI controller 132 removes the control information for the specified time slot from the control data structure of TSI 108, at step 802. It then decrements the internal count of the number of active channels, at step 804, and recomputes and stores the value of the "channel compare" variable, at step 806. TSI controller 132 then returns, at step 808.

FIG. 9 shows the response of TSI controller 132 to the receipt of an "add pending" command from system sequencer 138 (see step 210 of FIG. 2). Upon receipt of the command, at step 900, TSI controller 132 checks whether the value of the "AAL1 assembly start" variable is less than the value of the "channel compare" variable, at step 902. If not, it means that ATM cells for another channel are not to be allowed to mature during the next and every subsequent 47th frame period. TSI controller 132 therefore merely returns to the point of its invocation, at step 904. If the value of the "AAL1 assembly start" variable is less than the value of the "channel compare" variable, it means that ATM cells for another channel may be allowed to mature during the next and every subsequent 47th frame period. TSI controller 132 therefore proceeds to perform its "add time slot" function of FIG. 7, at step 906, to enable cell constructor 100 to start processing traffic of the waiting new channel.

Figure 10:
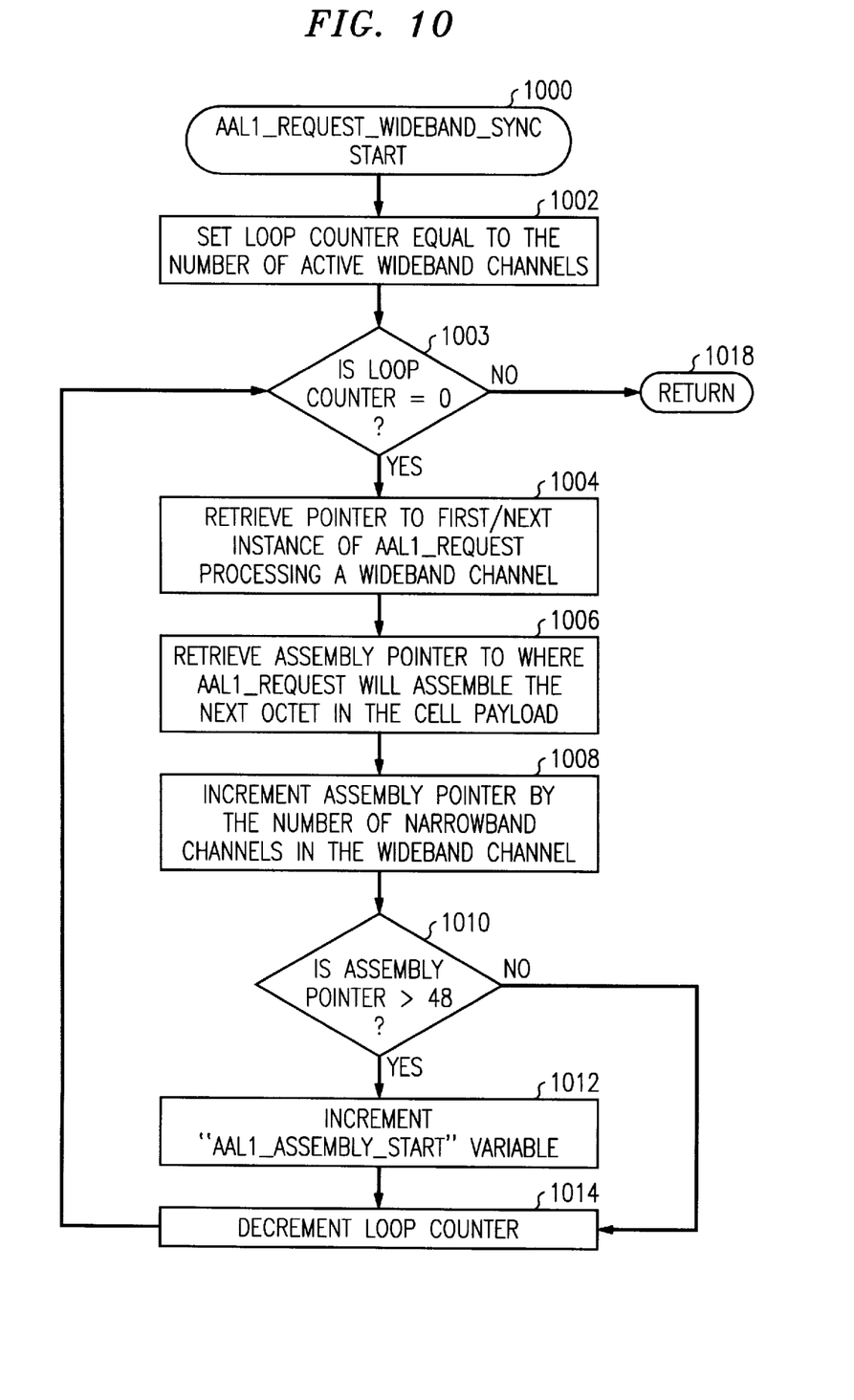
FIG. 10 is a functional flow diagram of operations of an AAL1-request-wideband-sync function of the AAL1-request component of the ATM cell constructor of FIG. 1.

The high-level functionality of the AAL1-request-wideband-sync function of AAL1-request 112 is shown in FIG. 10. Upon its invocation, at step 1000, the function sets a loop-counter variable equal to the total number of wideband channels presently being processed by all instances of AAL1-request 112, at step 1002, and checks if the value of the loop counter is zero, at step 1003. If the loop-counter value is zero, it means that the function has analyzed all instances of AAL1-request 112 that are presently processing wideband channels, and so the function returns to the point of its invocation, at step 1018. If the loop-counter value is not zero, the function proceeds to step 1004 to analyze the next instance of AAL1-request 112 that is processing a wideband channel. At step 1004, the function retrieves a pointer to the first instance of AAL1-request 112 that is presently processing a wideband channel, and from that instance obtains an assembly pointer that points to the next ATM cell octet which the instance of AAL1-request 112 will assemble in the cell payload during the next frame interval, at step 1006. The function then increments the assembly pointer by the number of narrowband channels (time slots per frame) that constitute the wideband channel (it is assumed here that all wideband channels have the same known size), at step 1008, and checks whether the value of the incremented assembly pointer is greater than 48 (the number of octets in an ATM cell payload), at step 1010. If the assembly pointer exceeds 48, it means that the subject instance of AAL1-request 112 will complete assembly of a cell payload and start a new cell payload during the next cell construction period, so the function increments the "AAL1-assembly-start" variable to notify TSI controller 132, at step 1012. Following step 1012, or if the assembly pointer does not exceed 48, the function decrements the loop counter, at step 1014, and returns to step 1003 to determine if it has analyzed all instances of AAL1-request 112 that are presently processing wideband channels.

Of course, various changes and modifications to the illustrative embodiment described above may be envisioned. For example, different algorithms may be used to anticipate the number of cells maturing at the same time. Also, control of the "add pending" flag and/or performance of the "add pending" function can be effected by the command function. Such changes and modifications can be made without departing from the spirit and the scope of the invention and without diminishing its attendant advantages. It is therefore intended that such changes and modifications be covered by the following claims.

What is claimed is:

1. A method of limiting traffic-delay variations of existing communications that are caused by new communications in facilities that are shared by the existing and the new communications, comprising:

maintaining substantially constant traffic-delays in the traffic of existing communications; and shifting delay variations to start times of assembly of traffic packets of the new communications.

2. The method of claim 1 wherein:

the shifting comprises delaying the start times of the assembly of traffic packets of the new communications.

3. A method of limiting transmission-delay variations between transmitted packets bearing segments of communications traffic of individual existing communications-channels that are caused by packets bearing segments of communications traffic of new communications channels in a multi-channel transmission system that is shared by the existing and the new communications channels, comprising:

determining if packets bearing segments of traffic become available for transmission from a threshold number of the channels at a same time;

in response to determining that packets bearing segments of traffic do not become available from the threshold number of the channels, allowing a new channel to commence assembling packets bearing segments of traffic to make them available for transmission at said same time; and in response to determining that packets bearing segments of traffic do become available from the threshold number of the channels, preventing the new channel from commencing to assemble the packets bearing segments of traffic to prevent them from being available for transmission at said same time.

4. The method of claim 3 wherein:

the preventing comprises preventing until such time as it is determined that packets bearing segments of traffic do not become available from the threshold number of the channels at same said such time; and allowing the new channel to commence assembling the packets bearing segments of traffic to make them available for transmission at said same such time.

5. The method of claim 3 wherein:

the determining comprises anticipating whether the packets bearing segments of traffic will become available for transmission from the threshold number of the channels at the same time.

6. The method of claim 3 wherein:

the Packets bearing segments of traffic are asynchronous transfer mode (ATM) cells; and the system is an ATM transmission system that transmits cells of all said channels.

7. The method of claim 3 wherein:

said same time is a same predetermined time interval.

8. The method of claim 3 wherein:

said same time is a time interval during which a packet bearing a segment of traffic can become available for transmission from each said channel.

9. A method of limiting transmission-delay variations between successive asynchronous transfer mode (ATM) cells of traffic of individual channels in a multi-channel ATM system, comprising:

determining how many cells will mature for transmission in a next cell construction period;

comparing the determined number of maturing cells against a threshold;

permitting a channel waiting to begin transmission to commence maturing cells for transmission during said cell construction period, if the number of maturing cells falls below the threshold; and preventing the waiting channel from commencing to mature cells for transmission during said cell construction period, if the number of maturing cells does not fall below the threshold.

10. The method of claim 9 further comprising:

repeating the determining and the comparing at least during each cell construction period during which there is a channel waiting to begin transmission; and permitting said any channel to commence maturing cells for transmission during a first cell construction period for which the number of maturing cells is determined to fall below the threshold.

11. The method of claim 9 wherein:

the threshold is proportional to a total number of presently-transmitting channels.

12. The method of claim 9 wherein:

the threshold comprises a total number of presently-transmitting channels divided by a number of octets of traffic carried by each cell, plus one.

13. The method of claim 9 wherein:

the ATM system receives the traffic of the channels in a plurality of time slots that form a repeating frame; and the cell construction period comprises a period of duration of the frame.

14. The method of claim 9 wherein:

a cell construction period comprises a period of time during which a cell from each channel can mature.

15. The method of claim 9 wherein:

the determining comprises whenever an ATM AAL1 layer of processing completes assembling a payload of an ATM cell, updating a count, and resetting the count at an end of each cell construction period; and the comparing comprises comparing the count against the threshold.

16. The method of claim 9 wherein:

the permitting comprises permitting the transmission system to start processing traffic of the waiting channel; and the preventing comprises preventing the transmission system from starting to process traffic of the waiting channel.

17. A computer-readable medium containing instructions representing a computer program which, when executed in a computer, causes the computer to function in the manner of claim 1 or 2 or 3 or 4 or 5 or 6 or 7 or 8 or 9 or 10 or 11 or 12 or 13 or 14 or 15 or 16.

18. A communications apparatus for limiting traffic-delay variations of existing communications that are caused by new communications in facilities that are shared by the existing and the new communications, comprising:

an effector of maintaining substantially-constant traffic-delays in traffic packets of existing communications, to limit traffic-delay variations of the existing communications; and an effector of shifting the delay variations to start times of assembly of traffic packets of the new communications.

19. The apparatus of claim 18 wherein:

the effector of shifting comprises an effector of delaying the start times of the assembly of the traffic packets of the new communications in the apparatus.

20. An apparatus for limiting traffic-delay variations of existing communications that are caused by new communications in facilities that are shared by the existing and the new communications, comprising:

means for maintaining substantially constant traffic-delays in the traffic of existing communications; and means for shifting delay variations to start times of assembly of traffic packets of the new communications.

21. The apparatus of claim 20 wherein:

the means for shifting comprises
means for delaying the start times of the assembly of traffic packets of the new communications.

22. An apparatus for limiting transmission-delay variations between transmitted packets bearing segments of communications traffic of individual existing communications channels that are caused by packets bearing segments of communications traffic of new communications channels in a multi-channel transmission system that is shared by the existing and the new communications channels, comprising:

means for determining if packets bearing segments of traffic become available for transmission from a threshold number of the channels at a same time;

means responsive to determining that packets bearing segments of traffic do not become available from the threshold number of the channels, for allowing a new channel to commence assembling packets bearing segments of traffic to make them available for transmission at said same time; and means responsive to determining that packets bearing segments of traffic do become available from the threshold number of the channels for preventing the new channel from commencing to assemble the packets bearing segments of traffic to prevent them from being available for transmission at said same time.

23. The apparatus of claim 24 wherein:

the means for preventing comprises
means for preventing until such time as it is determined that packets bearing segments of traffic do not become available from the threshold number of the channels at same said such time; and
means for allowing the new channel to commence assembling the packets bearing segments of traffic to make them available for transmission at said same such time.

24. The apparatus of claim 22 wherein:

the means for the determining comprises
means for anticipating whether the packets bearing segments of traffic will become available for transmission from the threshold number of the channels at the same time.

25. The apparatus of claim 22 wherein:

the packets bearing segments of traffic are asynchronous transfer mode (ATM) cells; and the system is an ATM transmission system that transmits cells of all said channels.

26. The apparatus of claim 22 wherein:

said same time is a same predetermined time interval.

27. The apparatus of claim 22 wherein:

said same time is a time interval during which a packet bearing a segment of traffic can become available for transmission from each said channel.

28. An apparatus for limiting transmission-delay variations between successive asynchronous transfer mode (ATM) cells of traffic of individual channels in a multi-channel ATM system, comprising:

means for determining how many cells will mature for transmission in a next cell construction period;

means for comparing the determined number of maturing cells against a threshold;

means for permitting a channel waiting to begin transmission to commence maturing cells for transmission during said cell construction period, if the number of maturing cells falls below the threshold; and means for preventing the waiting channel from commencing to mature cells for transmission during said cell construction period, if the number of maturing cells does not fall below the threshold.

29. The apparatus of claim 28 further comprising:

means for repeating the determining and the comparing at least during each cell construction period during which there is a channel waiting to begin transmission; and means for permitting said any channel to commence maturing cells for transmission during a first cell construction period for which the number of maturing cells is determined to fall below the threshold.

30. The apparatus of claim 28 wherein:

the threshold is proportional to a total number of presently-transmitting channels.

31. The apparatus of claim 25 wherein:

the threshold comprises a total number of presently-transmitting channels divided by a number of octets of traffic carried by each cell, plus one.

32. The apparatus of claim 25 wherein:

the ATM system receives the traffic of the channels in a plurality of time slots that form a repeating frame; and the cell construction period comprises a period of duration of the frame.

33. The apparatus of claim 25 wherein:

a cell construction period comprises a period of time during which a cell from each channel can mature.

34. The apparatus of claim 25 wherein:

the means for determining comprises
means for updating a count whenever an ATM AAL1 layer of processing completes assembling a payload of an ATM cell, and
means for resetting the count at an end of each cell construction period; and the means for comparing comprises
means for comparing the count against the threshold.

35. The apparatus of claim 25 wherein:

the means for permitting comprises
means for permitting the transmission system to start processing traffic of the waiting channel; and the means for preventing comprises
means for preventing the transmission system from starting to process traffic of the waiting channel.

* * * * *